July 11, 1939.  J. L. FINCH  2,165,844
METHOD AND MEANS FOR MODULATION
Original Filed Feb. 27, 1933  2 Sheets-Sheet 1
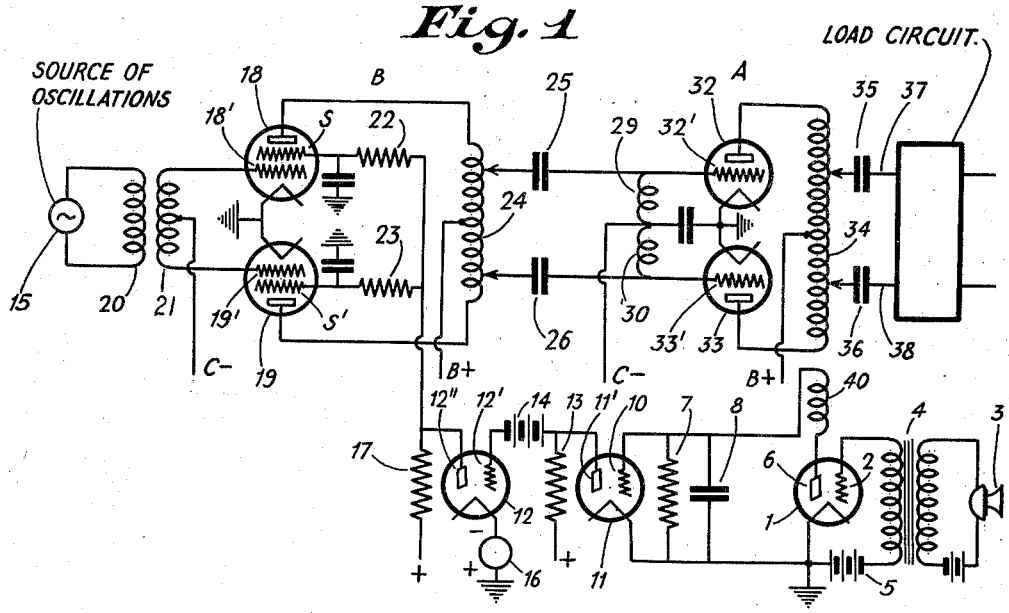
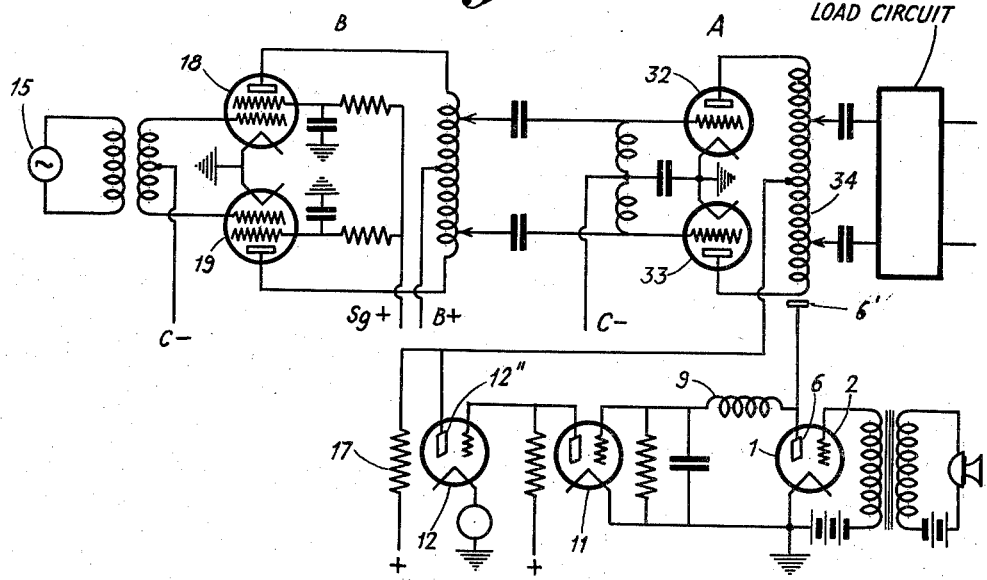
INVENTOR
J. L. FINCH
BY J. S. Grover
ATTORNEY July 11, 1939.        J. L. FINCH         2,165,844
           METHOD AND MEANS FOR MODULATION
      Original Filed Feb. 27, 1933    2 Sheets-Sheet 2

*Fig. 3*

INVENTOR
J. L. FINCH
BY  *H.S.Grover*
ATTORNEY

Patented July 11, 1939

2,165,844

UNITED STATES PATENT OFFICE 2,165,844

METHOD AND MEANS FOR MODULATION

James L. Finch, Rocky Point, N. Y., assignor to Radio Corporation of America, a corporation of Delaware Original application February 27, 1933, Serial No. 658,735, now Patent No. 2,031,639, dated February 25, 1936. Divided and this application January 15, 1936, Serial No. 59,214

13 Claims. (Cl. 179—171)

This application is a division of my United States Appln. Ser. No. 658,735, filed Feb. 27, 1933 Patent #2,031,639 dated February 25, 1936 and concerns a system of modulation that may be applied to a wide variety of uses, such as for the control of a system of power generation or transference in respect to its intensity, phase, frequency, or other properties. The invention is praticularly applicable to modulation of high frequency oscillations in any of their characteristics at signal frequency. It may also be applied to the control of light or heat or fluid streams or of magnetic fields, or to the speed of moving elements or vehicles.

The principle upon which the present invention operates is that of providing a detecting device in the system after the point of change or modulation, which detecting device is responsive to the change or modulation desired. The detecting device is equipped with a control element and is so arranged that its output reacts back to a point earlier in the system so as to produce a degenerative effect. The control element in the detector permits the degenerative effect to go to a definite point which is determined by the control element, but no further than said point. The definite point is adjustable. Thus the system is changed or modulated in accordance with the control element in the detector.

In the prior art it has been the practice to produce modulation by means of some control element and to design the system to given linear response to this control element and to suppress any other factors which tend to produce extraneous modulation. Due to the difficulties encountered the resulting modulation is frequently distorted and different from that desired. My invention makes unnecessary these precautions, which are normally expensive and difficult to accomplish.

The novel features of my invention have been pointed out with particularity in the claims appended hereto. The nature of my invention and the operation thereof will be best understood from the detailed description thereof, which follows, and therefrom when read in connection with the attached drawings, in which:

Figure 1 shows a radio transmitter including my novel oscillation relaying device and my novel control means which determine the character of the oscillations being relayed. In this arrangement, energy is derived from the output of a high frequency amplifier connected to a modulator, impressed on a modulation frequency amplifier, and acts therein to control the character of the modulating potentials applied by way of coupling tubes from the modulation frequency amplifier to an electrode in the modulator stage to control the same.

Figures 2 and 3 show modifications of the arrangement of Figure 1. In Fig. 2, the energy derived from the output of the amplifier is impressed on a capacity element connected to an electrode in the modulation frequency amplifier instead of on an inductance, and the controlled modulating potentials are applied to the output of the high frequency amplifier to accomplish control modulation in the same stage from which the controlling energy is derived. In Fig. 3, which is similar in many respects to Fig. 2, the controlled modulating potentials are applied to the control electrodes of the amplifier stage to accomplish therein grid modulation.

I will describe specific embodiments of my invention as applied to the amplitude modulation of a radio transmitter, the modulation of a magnetic field, and the modulation of a beam of light. It will be understood, however, that the invention is readily applicable to other types of modulation.

Referring to Figure 1 of the drawings, A is the final stage of a transmitter. The final stage A is excited by stage B. The stage B comprises a pair of thermionic tubes 18 and 19 having the control grids 18' and 19' connected to the opposite terminals of a winding 21, the center point of which may be connected, as shown, to the pole of a biasing source, not shown, at —C. The inductance 21 may be coupled by way of circuit 20 to any source of high frequency oscillations 15. The oscillations impressed from 15 on 21 are repeated and amplified in the tubes 18 and 19 and appear in the inductance 24 connected between the anodes of tubes 18 and 19. The oscillations appearing in 24 are applied to the control grids 32' and 33' of tubes 32 and 33 by way of coupling and blocking condensers 25 and 26. Biasing potential for the grids 32' and 33' of tubes 32 and 33 is supplied from —C connected to a source, not shown, by way of choking coils 29 and 30 respectively. The high frequency oscillations impressed on the control grids of the power amplifier tubes in stage A are repeated and amplified in said tubes and appear in the inductance 34 connected between their anodes. The amplified oscillations may be supplied from the inductance 34 in any manner to a load circuit. For example, the energy may be fed to the load circuit through coupling condensers 35 and 36 in lines 37 and 38 tapped to inductance 34.

1 is a three element tube which serves as the detector variably coupled by way of an inductance 40 connected to its anode 6 to the output of the final stage A and responsive to the amplitude of the output of said stage. The voltage on control grid 2 is made responsive to the voice currents in microphone 3 by means of transformer 4 and bias battery 5. When the voltage impressed on anode 6, due to the output of A, is high enough to overcome the effect of the blocking voltage on 2, anode current will flow in tube 1, the direct current component returning through resistor 7 and the alternating current component through smoothing capacitor 8. Inductance 40 also prevents the radio frequency anode potential, transferred to 6 from the final stage of A, from being short-circuited by 8. The control grid 10 of amplifier tube 11 has a potential impressed on it due to the resistance drop of the current flowing through 7. This amplifier tube 11 is resistance coupled to the control grid 12' of modulator tube 12 by means of resistor 13 and bias battery 14. The modulator tube 12 has its anode electrode 12" connected to its cathode by way of resistance 17 and a source of direct current voltage not shown. The screen grid electrodes S and S' of tubes 18 and 19 are connected, as shown, to the resistance 17. A change of current intensity flowing in resistance 17 causes a change in the potential applied to the screen grids of tubes 18 and 19. As the current through 17 decreases, the potential on the screen grid electrodes 18' and 19' increases and vice versa. In this manner, the tube 12 modulates the screen grids of tubes 18 and 19 in the radio frequency amplifier stage B.

The proportions of these circuits are so chosen that when the peak radio frequency potential on 6 exceeds the cut-off voltage as determined by the voltage on 2 by an appreciable amount, the reaction back through the modulator tube 12 will reduce the amplitude of the oscillations supplied by stage B to stage A, and the power output of A until the peak radio frequency potential on 6 just barely exceeds the cut-off voltage. Thus, as the potential on grid 2 is varied in accordance with the voice, the cut-off voltage of 1 is varied in proportion and the peak radio frequency potential output is automatically adjusted to just exceed this voltage. Thus, the output voltage is modulated truly in accordance with the modulating potentials.

Now, if some extraneous modulation is introduced, such as a power hum modulation on the output of radio frequency source 15, or if the gain of stage A or B is varied by reason of alternating current on the filaments, or due to inconstant plate or bias voltages, such modulation will be practically eliminated due to the degeneration introduced by the circuits of this invention. More specifically, such extraneous hum will cause an increase of the potential applied to 6. This increase in potential on 6 will act through amplifier 11 and modulator 12 to instantly reduce the potential on the screen grids S and S' of tubes 18 and 19 and reduce the amplitude of the oscillations supplied thereby to stage A.

It will be noted that the amplifier and modulator, tubes 11 and 12, employed in this invention need not have a linear characteristic since any distortion introduced from this cause is of a secondary order.

The filament of the modulator 12 is shown at a negative potential with reference to the filaments of the modulated stage B. This is necessary in order to fully modulate the stage B through the screen grids.

The operation of this invention as applied to a radio transmitter using voice control and amplitude modulation is as follows:

Starting with no modulation, grid 2 will assume a potential at the middle of its operating range. Assume also that momentarily tube 12 is blocked, thus allowing stage B to pass a maximum amount of power on to stage A. Stage A will in turn put out a maximum power and coincidently will induce a maximum radio frequency voltage on 6. This causes a direct current potential to be impressed on 7 of a value much in excess of that required when acting through amplifier 11 and modulator 12 to decrease the output of B to zero, but when this output has dropped to a value low enough for the voltage on the output of A to have dropped to half value, the voltage on 6 will have dropped to a value just sufficient for the peaks to exceed cut-off and thus a stable condition at this voltage is maintained. Now, assume the voice causes 2 to drop to the most negative potential of its range. This will momentarily cut off tube 1, dropping the voltage on 7 to zero, which will in turn reduce the current in 17 and cause the screen grids of B to reach their maximum operating potential. This in turn will increase the gain of B and the output of A will rise to its maximum voltage value. The latter will be just sufficient to impress a high enough voltage on 6 to rectify a small amount of current and thus to maintain this value. Similarly, the output voltage will follow in inverse proportion any voltage impressed on 2 and thus will follow the voice currents.

It will be understood that the arrangement shown in Figure 1 may be modified in various manners without departing from the scope of the present invention. For example, the modulation of the oscillations may be accomplished in the stage A and anode modulation may be used as shown in Fig. 2. This is accomplished by connecting the anode of tube 12 to the lead supplying charging potentials to the anodes of the tubes 32 and 33 by way of the inductance 34. In this manner, the modulating tube 12 and the amplifier tubes 32 and 33 both draw current through the resistance 17. The potential of the resistance 17 therefore determines the potential applied to the anodes of the tubes 32 and 33 and consequently determines the amplitude of the oscillations impressed from said anodes to the tank circuit including inductance 34. Moreover, the potential from A may be impressed on the anode 6 of tube 1 by way of a conductive member 6' coupled at 34. In this case, the anode circuit of 1 may include a radio frequency choke 9 which serves one of the purposes of the inductance 40 of Figure 1. The circuit of Figure 2 may be the same in other respects as the circuits of Figures 1 and 2 and, as shown, is otherwise substantially the same as the circuit of Figure 1.

Where, for some reason, grid modulation in stage A is desired, the arrangement of Figure 3 may be used. In this arrangement, which may otherwise include features of the prior arrangements, the modulation potentials appearing on the anode 12" of 12 are supplied by way of the battery 41 and the choking inductances 29 and 30 to the control grid electrodes 32' and 33' of tubes 32 and 33 respectively. The control grids 32' and 33' are normally maintained at a negative potential by the battery 41 connected as shown. This normal bias is altered in accordance with the potentials appearing across the resistance 17 and in this manner the bias applied to the control grid electrodes 32' and 33' respectively is altered at modulating frequency.

Having thus described my invention and the operation thereof, what I claim is:

1. In a signalling system, a source of high frequency oscillations, a thermionic tube having input electrodes coupled to said source, said tube having output electrodes, a power amplifier tube having input electrodes coupled to the output electrodes of said first named tube, said power amplifier having output electrodes connected in an alternating current circuit, a source of modulating potentials, a control tube having input electrodes coupled to said source of modulating potentials and having output electrodes coupled by a modulation frequency circuit to the output electrodes of said power amplifier tube, and a direct coupling between the alternating current circuit coupled to the output electrodes of said power amplifier tube and an electrode in said control tube.

2. A signalling system comprising, a thermionic tube having input electrodes coupled to a source of high frequency oscillations, said tube having output electrodes, a power amplifier tube having input electrodes coupled to the output electrodes of said first named tube, said power amplifier tube having output electrodes connected in an alternating current circuit, a source of modulating potentials, an amplifier tube having input electrodes coupled to said source of modulating potentials and having output electrodes coupled by a modulation frequency circuit to the input electrodes of said power amplifier, and a direct coupling between the alternating current circuit connected with the output electrodes of said power amplifier and an electrode in said amplifier tube.

3. In a modulation system, a source of high frequency oscillations, an amplifier tube having input and output electrodes, means coupling said input electrode to said source, an alternating current circuit coupled to said output electrodes, a source of modulating potentials, a control tube having input electrodes coupled to said source of modulating potentials and having output electrodes connected, by a circuit responsive to potentials of a frequency of the order of the frequency of said modulating potentials, to an electrode in said amplifier tube to apply controlling potentials thereto, and a direct coupling between the alternating current circuit connected with said output electrodes of said amplifier tube and an electrode in said control tube to apply controlling potentials from the former to the latter.

4. In a modulation system, an electron discharge tube having input electrodes and having output electrodes, an alternating current circuit connected between said input electrodes, an alternating current circuit connected between said output electrodes, a source of modulating potentials, a control tube having input electrodes and output electrodes, a circuit connecting the input electrodes of said control tube to said source of modulating potentials, a circuit responsive to potentials of a frequency of the order of the frequency of said modulating potentials connected between an output electrode of said control tube and an electrode in said discharge tube, and a direct coupling between an output electrode of said discharge tube and an electrode in said control tube to apply controlling potentials from the former to the latter.

5. In a signalling system, an electron discharge tube having input electrodes coupled in an alternating current circuit and having output electrodes coupled in an alternating current circuit, a source of modulating potentials, an amplifier tube having input and output electrodes, means coupling the input electrodes of said amplifier tube to said source of modulating potentials, modulation potential amplifying means coupling the output electrodes of said amplifier tube to the input electrodes of said electron discharge tube, and a direct coupling between an electrode in said amplifier tube and an output electrode of said electron discharge tube.

6. In a modulation system, a carrier wave amplifying tube having a control grid electrode and a cathode energized by wave energy of carrier frequency, said tube also having an anode electrode connected in an alternating current output circuit in which output energy flows, signal frequency responsive means connected directly with said anode for lowering the gain of the tube when said output energy exceeds predetermined peak values, control means coupled directly to said alternating current output circuit for controlling the peak values, and signalling means operating on said control means for controlling said peak values at signal frequency.

7. In a signalling system, a carrier wave amplifier tube having a control grid and a cathode energized by wave energy of carrier frequency, said tube also having an anode connected in an alternating current output circuit, signal frequency responsive means connected directly with said control grid for lowering the gain of said tube when the energy in said output circuit exceeds predetermined peak values, and control means connected with said last named means and coupled directly to said alternating current output circuit and coupled to a source of signal potentials to be energized thereby for controlling said peak values.

8. In a modulation system, a carrier wave amplifying tube having a control grid electrode and a cathode energized by wave energy of carrier wave frequency, said tube also having an anode electrode connected in an alternating current output circuit in which output energy flows, a uni-directional potential circuit connected with one of said electrodes for lowering the gain of the tube when said output energy exceeds a predetermined peak value, control means coupling said aforesaid circuit to one of said electrodes and excited by energy therefrom for controlling the said peak value, and signalling means operating on said control means for controlling said peak value at signal frequency.

9. In a modulation system, a carrier wave amplifying tube having a control grid electrode and a cathode energized by wave energy of carrier wave frequency, said tube also having an anode electrode connected in an alternating current output circuit in which output energy flows, means connected by a uni-directional potential circuit with one of said electrodes for lowering the gain of the tube when said output energy exceeds predetermined peak values, control means including a rectifier coupling said last named means to said alternating current output circuit and excited by wave energy therefrom for controlling the said peak values, and signalling means operating on said control means for additionally controlling said peak values at signal frequency.

10. In a modulation system, a pair of carrier wave amplifying tubes each having a control grid electrode, a cathode electrode, and an anode electrode, means for impressing wave energy of carrier wave frequency on said control grid electrode and cathode electrode, an alternating current output circuit in which output energy flows connected with said anodes, a unidirectional potential circuit connected with corresponding electrodes in said tubes for lowering the gain of the tubes when said output energy exceeds a predetermined peak value, control means coupling said aforesaid means to corresponding electrodes in each of said tubes and excited by energy therefrom for controlling the said peak value, and signalling means operating on said control means for controlling said peak value at signal frequency.

11. In a modulation system, a pair of carrier wave amplifying tubes each having a control grid electrode, an anode electrode, and a cathode electrode, means for energizing said control grid electrodes by wave energy of carrier wave frequency, an alternating current output circuit in which output wave energy flows connected with said anode electrodes, means connected by a uni-directional potential circuit with corresponding electrodes of said tubes for lowering the gain of the said tubes when said output energy exceeds predetermined peak values, control means including a rectifier coupling said aforesaid means to said anodes and excited by wave energy impressed thereon from said anodes for controlling the said peak values, and signalling means operating on said control means for additionally controlling said peak values at signal frequency.

12. In a signalling system, a source of high frequency oscillations, a pair of electron discharge tubes having input electrodes coupled to said source, said tubes having output electrodes, a pair of power amplifier tubes having input electrodes coupled to the output electrodes of said first named pair of tubes, said power amplifier tubes having output electrodes connected in an alternating current circuit, a source of modulating potentials, a control tube having input electrodes coupled to said source of modulating potentials and having output electrodes coupled by modulating potential responsive means to the output electrodes of said power amplifier tubes, and a direct coupling between the alternating current circuit coupled to the output electrodes of said power amplifier tube and an electrode in said control tube.

13. In a signalling system, a pair of electron discharge tubes having input electrodes coupled to a source of high frequency oscillations, said tubes having output electrodes, a pair of power amplifier tubes having input electrodes coupled to the output electrodes of said first named tubes, said power amplifier tubes having output electrodes connected in an alternating current circuit, a source of modulating potentials, an amplifier tube having input electrodes coupled to said source of modulating potentials and having output electrodes coupled by modulating potential responsive means to the input electrodes of said power amplifier tubes, and a direct coupling between the alternating current circuit connected with the output electrodes of said power amplifier tubes, and an electrode in said amplifier tube.

JAMES L. FINCH.